US011220323B2

(12) United States Patent
Kierbel

(10) Patent No.: US 11,220,323 B2
(45) Date of Patent: Jan. 11, 2022

(54) AIRCRAFT HAVING ARTICULATED HORIZONTAL TAIL UNITS

(71) Applicant: Airbus SAS, Blagnac (FR)

(72) Inventor: Daniel Kierbel, Toulouse (FR)

(73) Assignee: AIRBUS SAS, Blagnac (FR)

( * ) Notice: Subject to any disclaimer, the term of this patent is extended or adjusted under 35 U.S.C. 154(b) by 395 days.

(21) Appl. No.: 16/297,841

(22) Filed: Mar. 11, 2019

(65) Prior Publication Data

US 2019/0291849 A1    Sep. 26, 2019

(30) Foreign Application Priority Data

Mar. 21, 2018  (FR) ...................................... 1852438

(51) Int. Cl.
| | |
|---|---|
| *B64C 5/10* | (2006.01) |
| *B64C 5/02* | (2006.01) |
| *B64C 9/02* | (2006.01) |
| *B64C 9/06* | (2006.01) |
| *B64C 5/06* | (2006.01) |
| *B64C 1/26* | (2006.01) |

(Continued)

(52) U.S. Cl.
CPC ................. *B64C 5/10* (2013.01); *B64C 1/26* (2013.01); *B64C 5/00* (2013.01); *B64C 5/02* (2013.01); *B64C 5/06* (2013.01); *B64C 9/00* (2013.01); *B64C 9/02* (2013.01); *B64C 9/06* (2013.01); *B64C 3/56* (2013.01); *B64C 2027/829* (2013.01)

(58) Field of Classification Search
CPC .... B64C 5/10; B64C 5/06; B64C 1/26; B64C 5/00; B64C 9/00; B64C 5/02; B64C 9/02; B64C 9/06; B64C 2027/829
See application file for complete search history.

(56) References Cited

U.S. PATENT DOCUMENTS 2,386,915 A * 10/1945 Spittler ................... B64C 13/00
                                                             244/88
3,575,363 A *  4/1971 Jenny ........................ B64C 9/00
                                                             244/13
(Continued)

FOREIGN PATENT DOCUMENTS

JP          H02262497 A     10/1990

OTHER PUBLICATIONS

French Search Report; priority document.

*Primary Examiner* — Timothy D Collins
*Assistant Examiner* — Terri L Filosi
(74) *Attorney, Agent, or Firm* — Greer, Burns & Crain, Ltd.

(57) ABSTRACT

An aircraft comprising a fixed structure, a fuselage mounted on the fixed structure and a tail unit system comprising a structural element housed inside the fuselage and mounted to be rotationally mobile relative to the fixed structure about a transverse axis of rotation parallel to a transverse axis of the aircraft. A first actuation system displaces the structural element in rotation about the transverse axis of rotation, on either side of the structural element. A horizontal tail unit has one end rotationally mobiley mounted on the structural element about a longitudinal axis of rotation parallel to a longitudinal axis of the aircraft and another end which extends out of the fuselage by passing through a window in the fuselage. For each horizontal tail unit, a second actuation system displaces the horizontal tail unit in rotation about the longitudinal axis of rotation.

8 Claims, 2 Drawing Sheets

(51) Int. Cl.
  *B64C 5/00*      (2006.01)
  *B64C 9/00*      (2006.01)
  *B64C 27/82*      (2006.01)
  *B64C 3/56*       (2006.01)

(56) References Cited

U.S. PATENT DOCUMENTS

| | | |
|---|---|---|
| 5,096,143 A | 3/1992 | Nash |
| 5,707,029 A | 1/1998 | McIntosh |
| 2007/0102575 A1* | 5/2007 | Morgan .................... B64C 9/12 244/87 |
| 2010/0148000 A1 | 6/2010 | Llamas Sandin et al. |
| 2012/0267473 A1* | 10/2012 | Tao ........................... B64C 9/36 244/38 |
| 2016/0325821 A1* | 11/2016 | Golshany .................. B64C 5/02 |
| 2017/0361917 A1* | 12/2017 | Sauvinet ................. B64C 39/12 |

* cited by examiner

AIRCRAFT HAVING ARTICULATED HORIZONTAL TAIL UNITS

CROSS-REFERENCES TO RELATED APPLICATIONS

This application claims the benefit of the French patent application No. 1852438 filed on Mar. 21, 2018, the entire disclosures of which are incorporated herein by way of reference.

FIELD OF THE INVENTION

The present invention relates to an aircraft comprising a tail unit system comprising a port horizontal tail unit and a starboard horizontal tail unit which are articulated on two different axes of rotation.

BACKGROUND OF THE INVENTION

An aircraft conventionally comprises a fuselage at the rear of which is arranged a stabilization system comprising a vertical tail unit and a horizontal tail unit.

The vertical tail unit comprises a fixed vertical stabilizer and a rudder articulated on the vertical stabilizer. The vertical tail unit generates a drag and adds a significant weight to the aircraft while its usefulness is limited during the different flight phases of the aircraft, in particular when cruising.

SUMMARY OF THE INVENTION

One object of the present invention is to propose an aircraft comprising a tail unit system comprising a port horizontal tail unit and a starboard horizontal tail unit, in which each is articulated on two different axes of rotation, thus allowing the vertical tail unit to be removed and the drag and the weight of the aircraft to be reduced.

To this end, an aircraft is proposed comprising a fixed structure, a fuselage mounted on the fixed structure and a tail unit system comprising:

a structural element housed inside the fuselage and mounted to be rotationally mobile relative to the fixed structure about a transverse axis of rotation parallel to a transverse axis Y of the aircraft, a first actuation system intended to displace the structural element in rotation about the transverse axis of rotation, on either side of the structural element, a horizontal tail unit, one end of which is mounted to be rotationally mobile on the structural element about a longitudinal axis of rotation parallel to a longitudinal axis X of the aircraft and another end of which extends out of the fuselage by passing through a window provided for this purpose, for each horizontal tail unit, a second actuation system configured to displace the horizontal tail unit in rotation about the longitudinal axis of rotation.

In such an aircraft, it is therefore no longer necessary to have a vertical tail unit which allows for a gain in terms of drag and weight.

Advantageously, each pivot link between the structural element and a horizontal tail unit takes the form of a double end fitting, in which the structural element takes the form of an end fitting between which is positioned a part of the horizontal tail unit, and in which the horizontal tail unit takes the form of an end fitting between which is positioned a part of the structural element, and in which a rod passes through the two end fittings.

Advantageously, the aircraft comprises, for each horizontal tail unit, a guard arranged around the horizontal tail unit and which is mounted to slide relative to the fuselage to block the window.

BRIEF DESCRIPTION OF THE DRAWINGS

The features of the invention mentioned above, and others, will emerge more clearly on reading the following description of an exemplary embodiment, the description being given in relation to the attached drawings, in which.

DETAILED DESCRIPTION OF THE PREFERRED EMBODIMENTS

Figure 1:
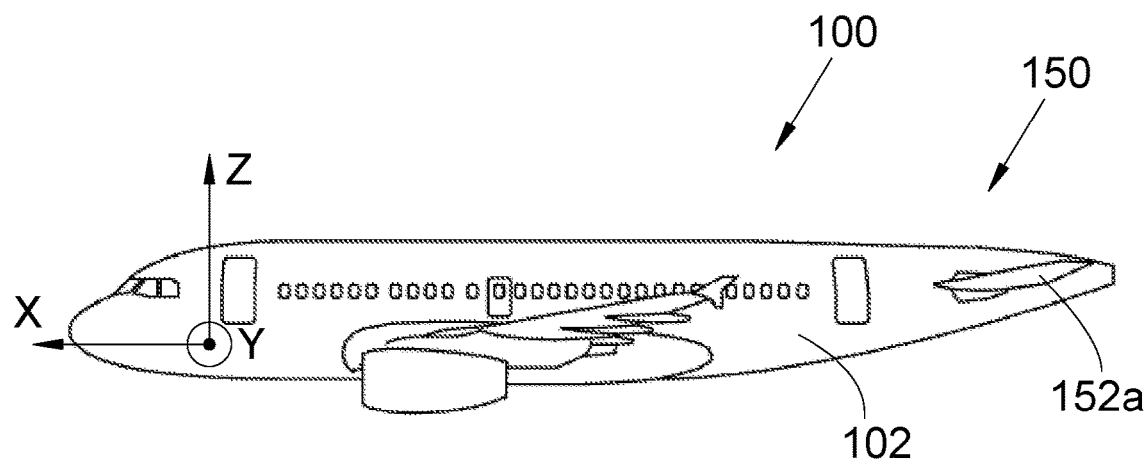
FIG. 1 is a side view of an aircraft according to the invention.

In the following description, the terms relating to a position are taken with reference to an aircraft in the normal position of use, that is to say, as is represented in FIG. 1, with its normal direction of advance oriented to the left. The normal direction of advance is parallel to the longitudinal axis X of the aircraft 100.

In the following description, by convention, the transverse axis Y corresponds to the direction oriented transversely relative to the aircraft, and the vertical axis Z corresponds to the vertical direction or height, these three directions X, Y, Z being mutually orthogonal.

FIG. 1 shows an aircraft 100 which comprises a fixed structure 104 (represented schematically in FIG. 2) on which is mounted a fuselage 102. The aircraft 100 also comprises a tail unit system 150 according to the invention arranged at the rear of the fuselage 102.

The tail unit system 150 does not include a vertical tail unit which makes it possible to reduce the draft and the weight of the aircraft 100.

Figure 2:
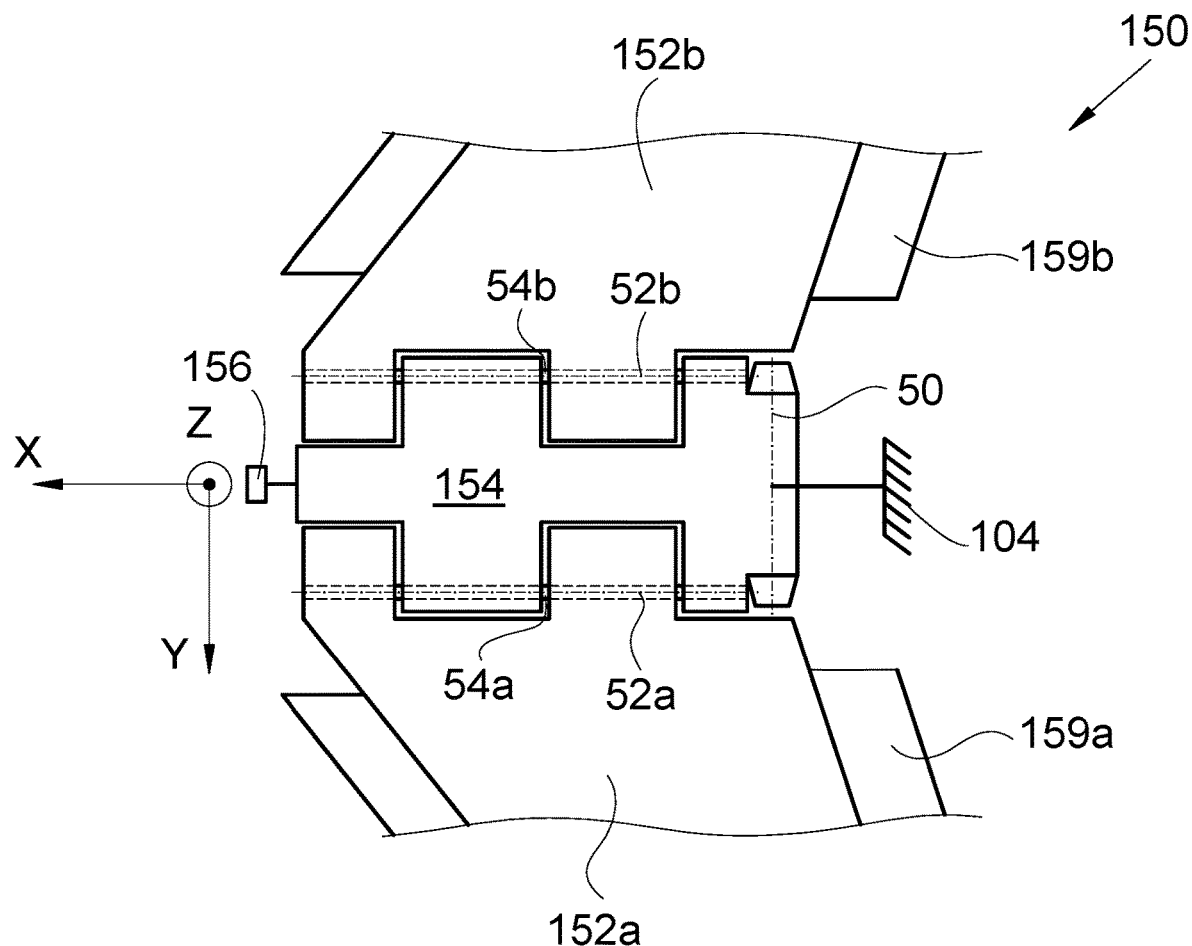
FIG. 2 is a plan view of a tail unit system according to the invention.
Figure 3:
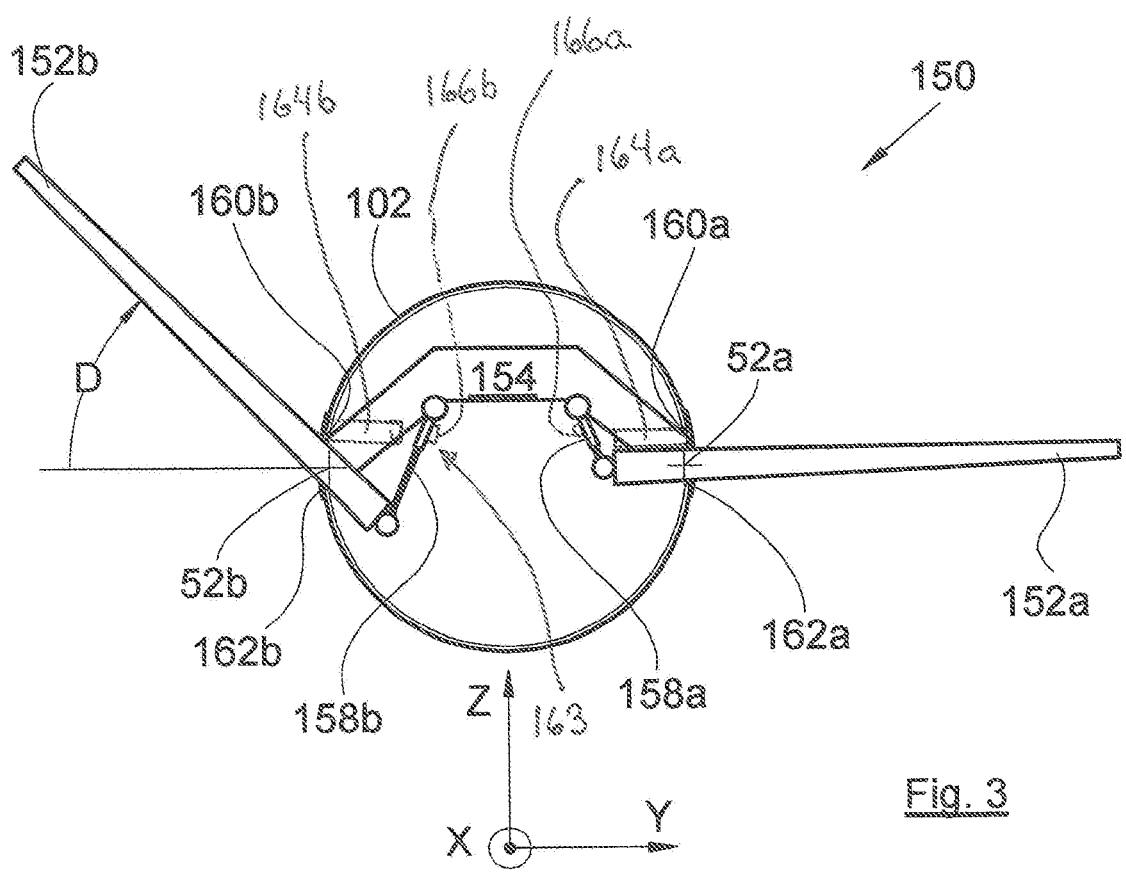
FIG. 3 is a front view of the tail unit system according to the invention.

FIG. 2 shows the tail unit system 150 in a plan view which comprises a port horizontal tail unit 152a and a starboard horizontal tail unit 152b. FIG. 3 shows the tail unit system 150 in a front view.

The tail unit system 150 also comprises a structural element 154, for example taking the form of a box. The structural element 154 is housed inside the fuselage 102 and it is mounted to be rotationally mobile relative to the fixed structure 104 about a transverse axis of rotation 50 which is parallel to the transverse axis Y.

As described below, a horizontal tail unit 152a, 152b is mounted on either side of the structural element 154 and of the fuselage 102 relative to a median plane XZ of the aircraft 100.

In the embodiment of the invention presented here, the transverse axis of rotation 50 is arranged at a rear part of the structural element 154, but another location is possible.

The pivot link between the structural element 154 and the fixed structure 104 is produced by any known systems, such as bearings, for example.

The tail unit system 150 also comprises a first actuation system 156 which is configured to displace the structural element 154 in rotation about the transverse axis of rotation 50.

The first actuation system 156 is, here, arranged at a front part of the structural element 154, but another location is possible. The first actuation system 156 can take different forms, such as, for example, a cylinder, a motor, worm screws, gears, or the like.

The first actuation system 156 is controlled by a control unit of the aircraft 100 as a function of the angular position that the structural element 154 must take about the transverse axis of rotation 50.

The rotation of the structural element 154 about the transverse axis of rotation 50 makes it possible to produce a trim function.

On either side of the structural element 154, a horizontal tail unit 152a, 152b is mounted to be rotationally mobile on the structural element 154 about a longitudinal axis of rotation 52a, 52b which is parallel to the longitudinal axis X. The longitudinal axis of rotation 52a, 52b is arranged in a part of each horizontal tail unit 152a, 152b which is inside the fuselage 102.

The two longitudinal axes of rotation 52a, 52b are at a distance from one another.

The pivot link between the structural element 154 and each horizontal tail unit 152a, 152b is produced by any known systems. In the embodiment of the invention presented here, each pivot link is produced by a rod 54a, 54b which passes through both the structural element 154 and the horizontal tail unit 152a, 152b concerned. Each pivot link takes the form of a double end fitting, in which the structural element 154 takes the form of an end fitting, between which is positioned a part of the horizontal tail unit 152a, 152b, and in which, at the same time, the horizontal tail unit 152a, 152b takes the form of an end fitting, between which is positioned a part of the structural element 154, and in which the rod 54a, 54b passes through the two end fittings.

The tail unit system 150 also comprises, for each horizontal tail unit 152a, 152b, a second actuation system 158a, 158b which is configured to displace the horizontal tail unit 152a, 152b in rotation about the longitudinal axis of rotation 52a, 52b as FIG. 3 shows.

Each second actuation system 158a, 158b is, here, arranged between the horizontal tail unit 152a, 152b and the structural element 154 and it can take different forms such as, for example, a cylinder, a motor, worm screws, gears or the like. The action of the actuation system 158a, 158b on the horizontal tail unit 152a, 152b is offset relative to the longitudinal axis of rotation 52a, 52b in order to benefit from a lever arm to displace the horizontal tail unit 152a, 152b. The actuation system 158a, 158b thus bears on the structural element 154 in order to transmit to it the loads that it is subjected to from the horizontal tail unit 152a, 152b.

For cost and weight reasons, it is possible to provide for the two second actuation systems 158a, 158b to share one and the same motor and for the transmission from the motor to each horizontal tail unit 152a, 152b to be effected via gears or worm screws.

The second actuation system 158a, 158b is controlled by the control unit as a function of the angular position that each horizontal tail unit 152a, 152b must take about the longitudinal axis of rotation 52a, 52b.

In the embodiment of the invention presented in FIG. 3, each second actuation system 158a, 158b takes the form of a cylinder mounted articulated by one end on the structural element 154 and mounted articulated by the other end on the horizontal tail unit 152a, 152b.

In the take-off and landing phase, the control unit controls each second actuation system 158a, 158b so as to increase the dihedron D (FIG. 3 on the left) to maximize the yaw control.

In the cruising phase, the control unit controls each second actuation system 158a, 158b so as to reduce the dihedron (FIG. 3 on the right) to maximize the pitch control.

In FIG. 3, the port horizontal tail unit 152a and the starboard horizontal tail unit 152b are in different positions, but, according to a preferred embodiment, they are activated symmetrically.

The passage of each horizontal tail unit 152a, 152b through the fuselage 102 requires the fuselage 102 to be pierced by a window 160a, 160b. To retain an aerodynamic surface at these windows 160a, 160b, the aircraft 100 comprises, for each horizontal tail unit 152a, 152b, a guard 162a, 162b arranged around the horizontal tail unit 152a, 152b and which is mounted to slide relative to the fuselage 102. Thus, in a displacement of the horizontal tail unit 152a, 152b, the guard 162a, 162b is displaced with the horizontal tail unit 152a, 152b while remaining pressed against the fuselage 102 to block the window 160a, 160b.

The guard 162a, 162b is mounted, for example, in runners of the fuselage 102 which are oriented overall vertically.

To ensure the safety of the assembly, it is possible to put in place blocking systems 163 which are provided to block each horizontal tail unit 152a, 152b in the position corresponding to the minimum dihedron in case of a fault on an element of the assembly. The blocking system 163 can be lock blocks 164a, 164b or automatic brakes 166a, 166b.

Conventionally, each horizontal tail unit 152a, 152b can also comprise, to the rear, an elevator 159a, 159b which is mounted to be rotationally mobile on the horizontal tail unit 152a, 152b.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising a fixed structure, a fuselage mounted on the fixed structure and a tail unit system comprising:
   a structural element housed inside the fuselage and mounted to be rotationally mobile relative to the fixed structure about a transverse axis of rotation parallel to a transverse axis Y of the aircraft,
   a first actuation system configured to displace the structural element in rotation about the transverse axis of rotation,
   on either side of the structural element, a horizontal tail unit, one end of which is mounted to be rotationally mobile on said structural element about a longitudinal axis of rotation parallel to a longitudinal axis X of the aircraft and another end of which extends out of the fuselage by passing through a window, for each horizontal tail unit, a second actuation system configured to displace said horizontal tail unit in rotation about the longitudinal axis of rotation.

2. The aircraft according to claim 1, wherein each pivot link between the structural element and a horizontal tail unit takes the form of a double end fitting, wherein the structural element takes the form of an end fitting, between which is positioned a part of the horizontal tail unit, and wherein the horizontal tail unit takes the form of an end fitting, between which is positioned a part of the structural element, and wherein a rod passes through the two end fittings.

3. The aircraft according to claim 1, further comprising, for each horizontal tail unit, a guard arranged around the horizontal tail unit and which is mounted to slide relative to the fuselage to block the window.

4. The aircraft according to claim 3, wherein the guard is mounted in vertically oriented runners on the fuselage.

5. The aircraft according to claim 1, further comprising a blocking system configured to block each horizontal tail unit in a position corresponding to a predetermined minimum dihedron.

6. The aircraft according to claim 5, wherein the blocking system comprises lock blocks.

7. The aircraft according to claim 6, wherein the blocking system comprises automatic brakes.

8. The aircraft according to claim 1, wherein each horizontal tail unit further comprises, to the rear, an elevator which is rotationally mobile on the horizontal tail unit.

* * * * *